(12) United States Patent
James (10) Patent No.: US 6,405,283 B1
(45) Date of Patent: Jun. 11, 2002

(54) METHOD FOR HANDLING BUFFER UNDER-RUN DURING DISC RECORDING (75) Inventor: Kenneth R. James, Sunnyvale, CA (US)

(73) Assignee: Roxio, Inc., Milpitas, CA (US)

( * ) Notice: Subject to any disclaimer, the term of this patent is extended or adjusted under 35 U.S.C. 154(b) by 0 days.

(21) Appl. No.: 09/448,030

(22) Filed: Nov. 23, 1999

(51) Int. Cl.⁷ .............................................. G06F 13/38
(52) U.S. Cl. ........................... 711/112; 710/52; 710/57
(58) Field of Search ........................ 711/112; 710/52, 710/57

(56) References Cited

U.S. PATENT DOCUMENTS

| | | | |
|---|---|---|---|
| 6,058,091 A | 5/2000 | Yokota et al. .................. 369/93 |
| 6,073,189 A | * 6/2000 | Bounsall et al. ................ 710/52 |
| 6,091,686 A | 7/2000 | Caffarelli et al. ......... 369/53.24 |
| 6,118,737 A | 9/2000 | Hütter ...................... 369/30.12 |
| 6,118,754 A | 9/2000 | Sako et al. ................ 369/275.3 |
| 6,141,489 A | 10/2000 | Honda ......................... 386/95 |

* cited by examiner

Primary Examiner—Reginald G. Bragdon
(74) Attorney, Agent, or Firm—Martine & Penilla, LLP (57) ABSTRACT

Disclosed is a method for handling buffer under-runs during disc recording sessions on an optical disc. The method includes the operations of recording a volume descriptor sequence for the recording session, and then recording the data for the recording session following the volume descriptor sequence. A track of the recording session is closed upon an occurrence of a buffer under-run, and a continuation of the data is recorded in a next track of the recording session. A file system is then written following the data written in the next track, such that the volume descriptor sequence has a pointer to the file system. In one example, the method includes estimating a number of buffer under-runs before beginning the recording, and adding a correction increment corresponding to the estimated number of buffer under-runs that is configured to define a location for writing the file system.

18 Claims, 5 Drawing Sheets

METHOD FOR HANDLING BUFFER UNDER-RUN DURING DISC RECORDING

CROSS REFERENCE TO RELATED APPLICATIONS

This application is related to U.S. patent application Ser. No. 09/447,964, filed on the same day as the instant application and entitled "OPTICAL DISC BUFFER UNDER-RUN HANDLING METHOD." This application is hereby incorporated by reference.

BACKGROUND OF THE INVENTION

1. Field of the Invention

The present invention relates generally to the recording of data onto optical discs, and more particularly to a method for handling buffer under-runs during recording sessions.

2. Description of the Related Art

Optical disc storage of data offers relatively high capacity data storage (e.g., approximately 640 Megabytes) on a relatively small and inexpensive optical disc. Optical disc recording commonly involves recording (sometimes referred to as "burning") several files of data on one or more spiral tracks on a optical disc, which can typically hold between 1 and 99 tracks. A file system (FS) is typically recorded at the beginning of a session and contains addressing information for the files, such as a volume descriptor sequence with address pointers to path tables indicating the file directory structure, and a directory descriptor indicating the file locations and logical block numbers. The volume descriptor sequence by convention (and in compliance with ISO standard 9660) is located in sector 16 (and sectors following sector 16 if needed) of the first track of a recording session. The ISO 9660 Specification (also referred to as the Information Processing-Volume and file structure of CD-ROM for information interchange) is hereby incorporated by reference.

When recording is desired, files of data to be recorded are typically retrieved from a hard disk drive, transferred to a faster access buffer memory, and the files on the buffer memory are continuously recorded onto one or more tracks of an optical disc during a recording session. However, as recording rates for optical discs increase beyond 4×(1× being defined as normal music playback speed), the rate of recording onto the optical disc frequently exceeds the rate at which the hard drive data source can replenish data in the buffer memory. A buffer under-run occurs when the buffer memory is unable to continuously provide data for an uninterrupted recording of the files to a given track of the optical disc. Eventually, after the buffer under-run occurs, the burning stops. Typically, there is a pre-gap of 150 sectors and a post-gap of 150 sectors for a total gap of 300 sectors (approximately 700 kilobytes) between the end of one track and the beginning of another track. This gap between tracks causes file addressing problems, since the new addresses of the remaining files (which were recorded after the buffer under-run) are not accurately reflected in the FS recorded at the beginning of the session. As such, when a read of a particular file that was recorded after the buffer under-run is desired, the reading will access an incorrect file due to the gap. Furthermore, multiple buffer under-runs can occur during a recording session, depending on the access speed and transfer speed of the data retrieval from the hard drive data source, the size and read/write speed of the buffer memory, and the data transmission rate required for continuously recording data onto the optical disc.

The consequences of one or more buffer under-runs during recording on an optical disc depend on the type of optical disc used during the recording. A CD-R optical disc can only undergo one recording, and the inaccessible remaining files typically cause the CD-R optical disc to be scrapped and replaced by a fresh CD-R optical disc for a repeated recording. A CD-R/W optical disc can undergo several recording sessions, since the optical disc can be erased and the recording can be repeated. However, the repeating recording sessions can take considerable time, especially if the recording is of a large track. Furthermore, regardless of whether the optical disc is CD-R or CD-R/W, another buffer under-run can occur during the repeated recording session, causing the loss of the time spent on the recording session, if not the entire optical disc (in the case of CD-R optical discs).

Figure 1A:
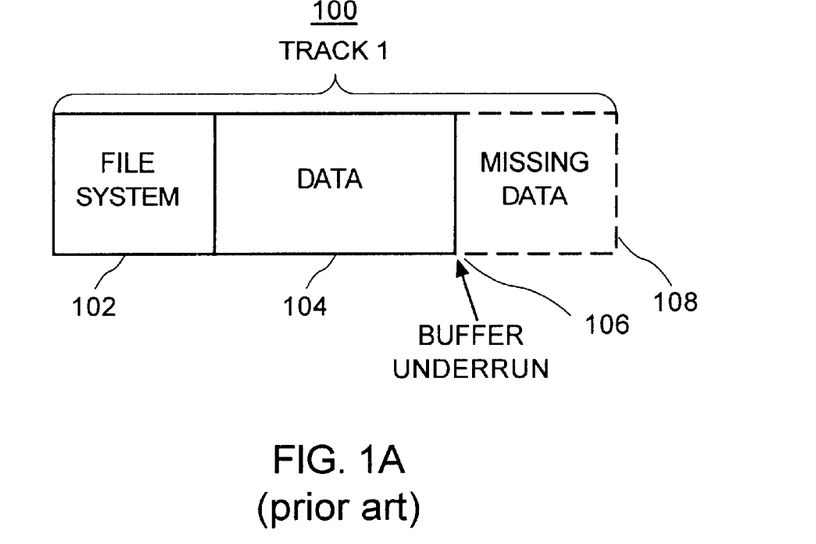
FIG. 1A shows a prior art track on an optical disc resulting from a recording session in which a buffer under-run has occurred.

FIG. 1A shows a prior art track 100 on an optical disc resulting from a recording session in which a buffer under-run has occurred. The file system (FS) 102 is recorded at the beginning of the track (which represents the beginning of a session) and then the data 104 recording follows, until stopped by the buffer under-run 106. The dotted lines indicate a missing remainder 108 of the data that would have been recorded in the track 100 if the buffer under-run had not occurred.

Figure 1B:
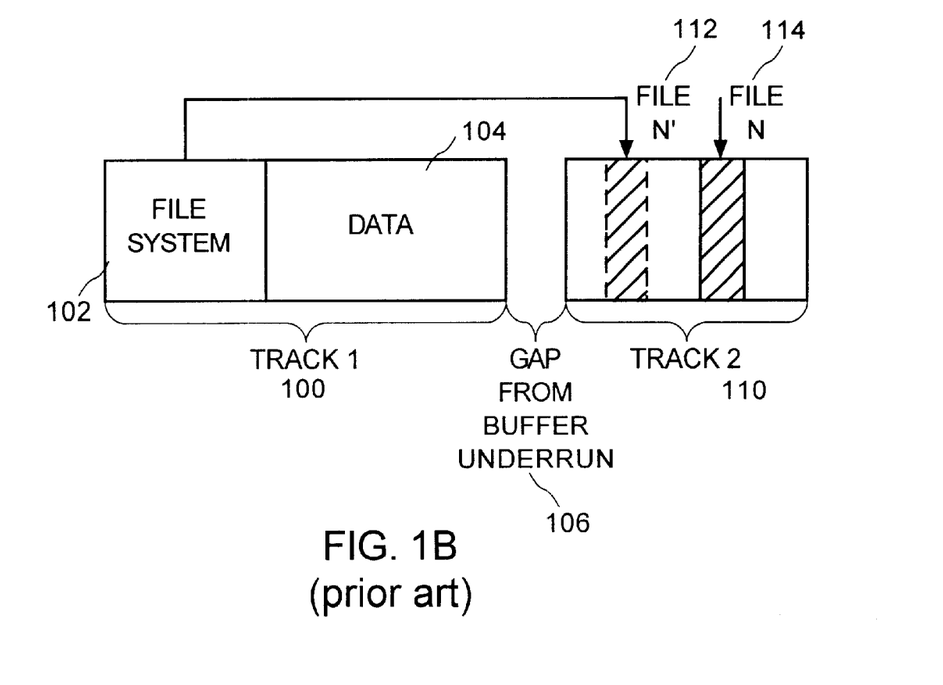
FIG. 1B shows a prior art track on an optical disc resulting from a recording session in which a buffer under-run has occurred, and the resulting difference created between a file address and the actual file address as the result of the buffer under-run.

FIG. 1B shows a prior art track 100 on an optical disc resulting from a recording session in which a buffer under-run 106 has occurred, and the resulting difference created between a file address and the actual file address as the result of the buffer under-run. The FS 102 is recorded at the beginning of the track, and then the data 104 recording follows, until stopped by the buffer under-run 106. The remainder of the data 108 is recorded in track 2 after the buffer under-run 106. The FS 102, which was recorded before the buffer under-run 106 occurred, points to the address 112 represented as file N', shown by dotted lines. The FS 102 address assumes that the file N' is located in the first track 100, which is incorrect. The actual address 114 of file N, shown by solid lines, is in the second track 110 as a result of the buffer under-run 106.

Thus, the occurrence of a buffer under-run causes several problems in conventional recording systems. The recording of a track of one or more files is stopped, and a physical gap is created between the original track and a new track of remaining files recorded after the buffer under-run. The addresses of files recorded after a buffer under-run do not correspond to the addresses for the files as indicated by the FS that was recorded before the buffer under-run, because of the gap between the original track and the next track which records the remaining files. Since the addresses of the files recorded after a buffer under-run are incorrect, the entire recording must be repeated on another disc if the disc cannot be erased and rewritten. Otherwise, if the same disc can be erased and rewritten (e.g., CD R/W), the tracks made during the interrupted recording session must be erased and re-recorded. Additional time and cost is required by the duplicate recording session as a result of the buffer under-run in either case.

In view of the foregoing, there is a need for a method that can handle buffer under-runs during a recording session on an optical disc. This method should be configured to avoid the problems of the prior art.

SUMMARY OF THE INVENTION

The present invention fills these needs by providing methods that can handle buffer under-runs during a recording session on an optical disc. The invention is a method for maintaining the addressing accuracy of the file system of a recording session, regardless of multiple buffer under-runs that may occur during the recording session. The present invention can be implemented in numerous ways, including as a process, an apparatus, a system, a device, a method, or a computer readable media. Several embodiments of the present invention are described below.

In one embodiment, a method for handling buffer under-runs while recording data onto a disc during a recording session is disclosed. The method includes recording a volume descriptor sequence for the recording session, and recording the data for the recording session following the volume descriptor sequence. A track of the recording session is then closed upon an occurrence of a buffer under-run. The recording of the data then continues in a next track of the recording session. A file system is written following the data recorded in the next track, and the volume descriptor sequence has a pointer to the file system. This method further includes the operation of estimating the number of buffer under-runs, and adding a correction increment to define a location for the file system.

Of course, there can be any number of corrections (i.e., one for each anticipated buffer under-run), for example, up to 98 corrections during a session that writes 99 files. In this embodiment, the closing of the track operation and the recording the continuation of the data in the next track is repeated at the occurrence of any other buffer under-runs that may occur during the recording session before the writing of the file system. As such, when there is more than one buffer under-run the next track will represent a last track written for the recording session.

In another embodiment, a computer readable media having program instructions for handling buffer under-runs associated with the recording of one or more files on a disc is disclosed. The computer readable media includes: (a) program instructions for recording a volume descriptor sequence for the recording session; (b) program instructions for recording the data for the recording session following the volume descriptor sequence; (c) program instructions for closing a track of the recording session upon an occurrence of a buffer under-run; (d) program instructions for recording a continuation of the data in a next track of the recording session; and (e) program instructions for writing a file system following the data written in the next track, and the volume descriptor sequence having a pointer to the file system. Preferably, the closing of the track instruction and the recording the continuation of the data in the next track is repeated at the occurrence of any other buffer under-runs that may occur during the recording session before the writing of the file system instruction is performed, and when there is more than one buffer under-run the next track will represent a last track written for the recording session.

In yet another embodiment, a method for handling buffer under-runs is disclosed. The method includes recording the one or more files onto the disc, and then recording path tables and a directory descriptor of a file system. A volume descriptor sequence is recorded onto the disc either before or after the path tables and the directory descriptor are recorded onto the disc.

One benefit and advantage of the invention is higher recording throughput of finished and usable optical discs. Another benefit is faster turn-around time for recording a usable optical disc. An additional benefit is the reduction in the cost of scrapping incompletely recorded and unusable optical discs. Yet another benefit is an increased practicality of optical disc recording at a higher recording speed. It should be noted that the benefits buffer under-run handling of the present invention are equally applicable to the ISO 9660 standard, the Joliet CD-ROM Recording Specification, as wells as the Universal Disk Format (UDF) standard, which is a subset of ISO 13346. The Joliet CD-ROM Recording Specification and all UDF standards are hereby incorporated by reference. Of course, other standards that suffer from buffer under-runs may also benefit from the invention claimed herein.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for handling buffer under-runs during a recording session on an optical disc is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2A:
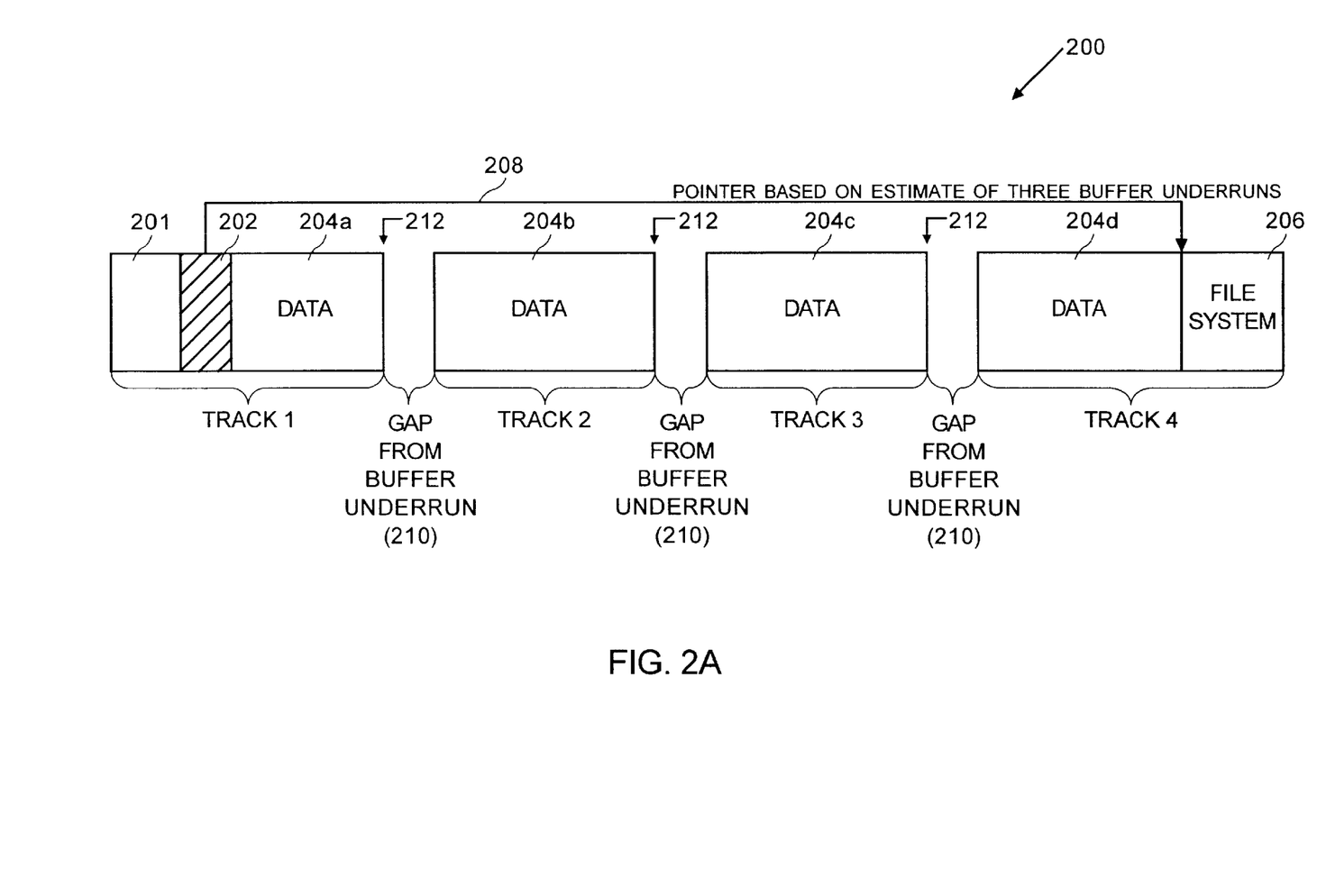
FIG. 2A shows the multiple tracks of data recorded as a result of three buffer under-runs occurring during a recording session, with the volume descriptor sequence pointing to the remainder of the file system, according to one embodiment of the invention.

FIG. 2A is a diagram 200 illustrating multiple tracks of data recorded as a result of three buffer under-runs that occurred during a recording session. In this embodiment, track 1 initially reserves sectors 1–15 in 201 and then a volume descriptor sequence (VDS) 202 is written in sector 16, or at least starting at sector 16. VDS 202 is configured to point to the remainder of a file system 206, which is written at a location after the data recording for a given recording session is complete. It should be understood that the VDS 202 is generally defined to encompass any number of recording standards that can benefit from the intelligent handling of buffer under-runs. In this embodiment, the VDS 202 can be written into more than one sector in both the ISO 9660 standard and the UDF standard. In the case of the UDF standard, an extended area descriptor is written to sector 16 and an anchor volume descriptor is written to sector 256. Preferably, the location at which the file system 206 is to be written is ascertained by performing an estimate of the number of buffer under-runs that may occur during a given recording session. Depending upon the recording standard, the file system 206 can take on different forms and can be referred to using different labels. For simplicity, we will make reference to file system 206 generically.

Once the VDS 202 is written, data 204a, 204b, 204c and 204d is written to track 1, track 2, track 3, and track 4. The data 204a that was recorded to track 1 was stopped hen a buffer under-run 212 occurred. After a buffer under-run 212 occurs, a gap 210 representing a post-gap and a pre-gap will be required before track 2 is recorded. Because the file system 206 has not yet been written for the files that will be written to track 2, the addressing problem of the prior art will no longer occur. That is, the information in file system 206 corresponding to the files written to track 2 will be written after the associated files have been written to track 2. Thus, the file system 206 will accurately reference the correct files throughout the session. In a like manner, the data 204b will continue to be written to track 2 until the next buffer under-run 212. This buffer under-run 212, as well as the buffer under-run 212 that will occur during the writing of track 3, will advantageously not affect the addressing of files written as data 204. Once the data 204d has been written to track 4, the file system 206 will be complete.

Figure 2B:
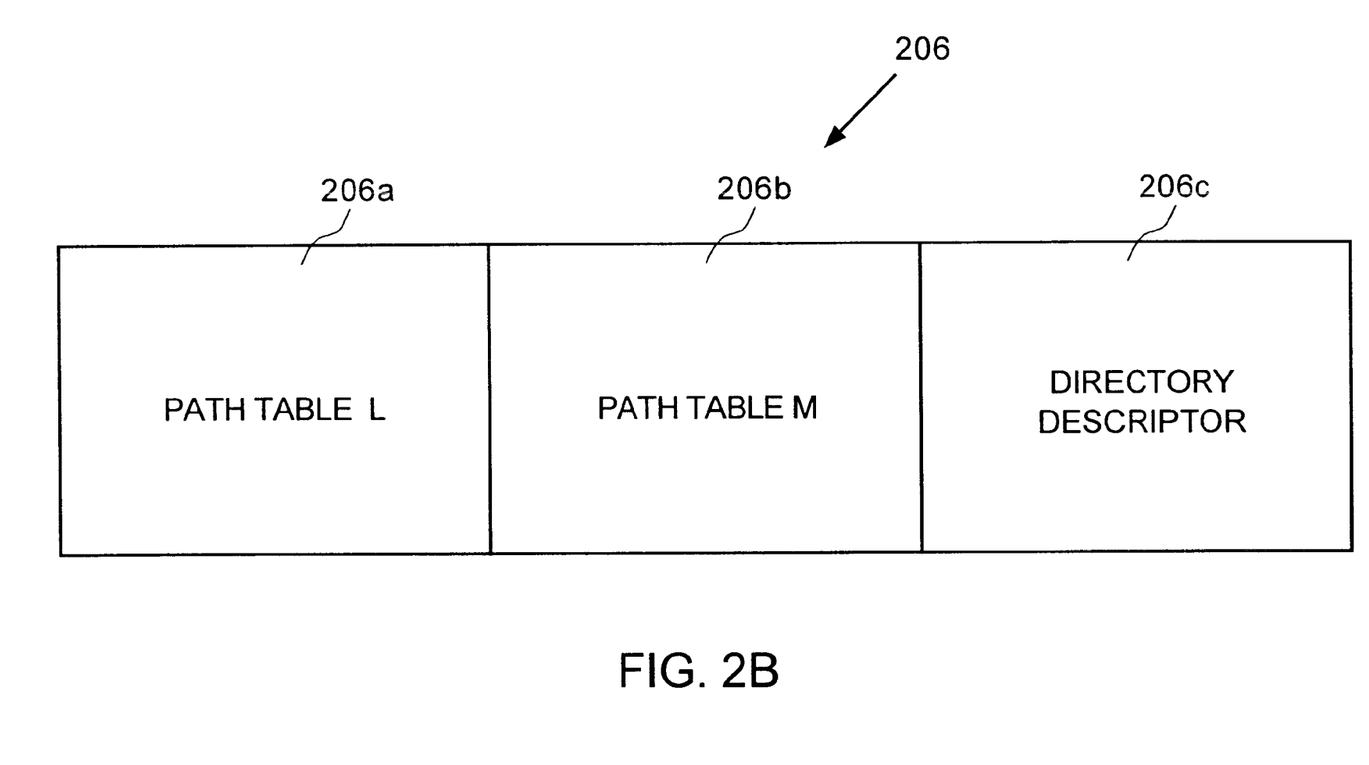
FIG. 2B shows the path tables and a directory descriptor of the file system in accordance with one embodiment of the invention.

During a read operation, the reading first refers to the VDS 202 which has a pointer 208 to the file system 206. As shown in FIG. 2B for a file system compliant to the ISO 9660 standard, the file system 206 includes a path table L 206a, a path table M 206b, and a directory descriptor 206c. Path table L 206a and path table M 206b contain the directory structure for the files that are recorded to a disc. The directory descriptor 206c contains the logical block numbers corresponding to the locations of the files in the directory. The pointer 208 is preferably configured to point to the beginning of the path table L 206a, the path table M 206b, and the directory descriptor 206c.

In either embodiment, the actual number of buffer under-runs that occur during a recording session should be less than or equal to the estimated number of buffer under-runs. When this condition is satisfied, then the buffer under-runs do not cause any addressing problems which require an additional recording session. If the number of buffer under-runs is less than the estimated number, then the file system 206 is still recorded at a location correspondingly shifted by the estimated number of gaps 210. In this case, there will be one or more extra gaps 210 before the file system 206. If the number of buffer under-runs that occur during a recording session exceeds the estimated number of buffer under-runs, then the additional buffer under-runs may cause an addressing problem. Therefore, the number of buffer under-runs should be estimated as accurately as possible.

In one embodiment, the estimation of the number of buffer under-runs during an anticipated recording session can be performed by analyzing results of a data transfer test. The data transfer test is performed on the hardware that will be used as the source of the data to be recorded to the optical disc. In other embodiments, the estimation can be made by a user based on prior experience with similar hardware and resulting buffer under-runs. In typical hardware configurations, it has been observed that an estimate of three buffer under-runs is sufficient to maintain correct file system addressing during a recording session.

Figure 3:
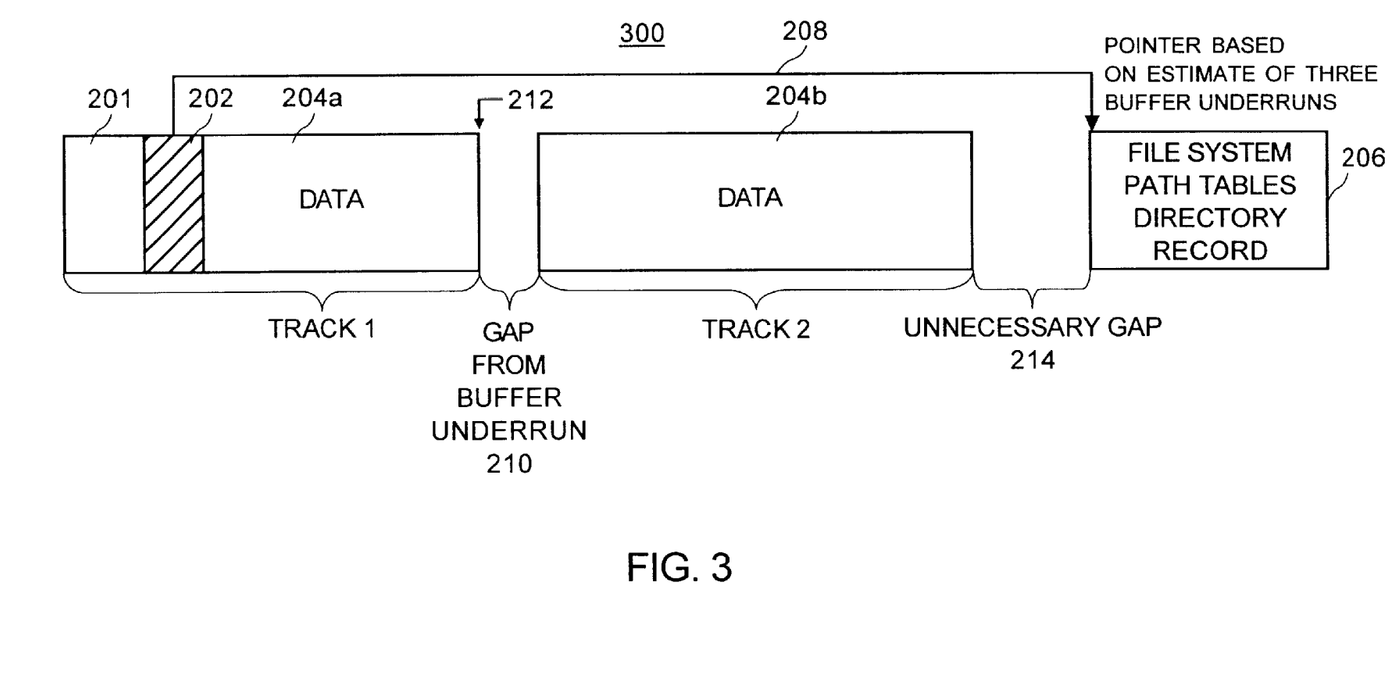
FIG. 3 is a diagram illustrating two tracks of data recorded as a result of one buffer under-run that occurred during a recording session, according to one embodiment of the invention.

FIG. 3 is a diagram 300 illustrating two tracks of data recorded as a result of one buffer under-run that occurred during a recording session, according to one embodiment of the invention. As is shown in FIG. 2A, track 1 initially reserves sectors 1–15 in 201, and then a VDS 202 is written in sector 16. VDS 202 is configured with a pointer 208 to the file system 206, which is written at a location after the recording of data for a given recording session is complete.

Once the VDS 202 is written, data 204a and 204b is written to track 1 and track 2. The data 204a that was recorded to track 1 was stopped when a buffer under-run 212 occurred. After a buffer under-run 212 occurs, a gap 210 representing a post-gap and a pre-gap occurs before track 2 is recorded. As discussed regarding FIG. 2A, because the file system 206 has not yet been written for the files that will be written to track 2, the addressing problem of the prior art does not occur. It should also be noted that the VDS 202 should also correctly identify where the file system 206 is located. As such, the information in file system 206 corresponding to the files written to track 2 will be written after the associated files for data 204b have been written to track 2. Thus, the file system 206 will accurately reference the correct files throughout the session. Once the data 204b has been written to track 2, the file system 206 will be complete.

In this embodiment, the estimated number of buffer under-runs 212 was three, but only one buffer under-run 212 occurred. Therefore, the file system 206 path tables and directory descriptor were recorded in a location corresponding to three gaps 210, and the pointer 208 of the VDS 202 corresponds to the actual location of the file system 206 (i.e., when the estimated number of buffer under-runs is three). Since only one buffer under-run 212 and one gap 210 occurred, there will necessarily be two extra 300 sector gaps placed before the file system 206. This creates an unnecessary gap 214, that represents an unused storage capacity of approximately 1.5 Megabytes (MB). Although the recording session may lose approximately 1.5 MB of storage capacity, this loss is a minor sacrifice compared to the major benefit of successfully concluding a recording session on the first attempt. In addition, because typical optical discs have a capacity of about 640 MB, the loss of about 1.5 MB is very small, and is only critical if a user desires to record the entire disc. In fact, a loss of 1.5 MB of storage capacity in this example is only a relative loss of about 0.23% of the total storage capacity of 640 MB on a typical optical disc.

Figure 4:
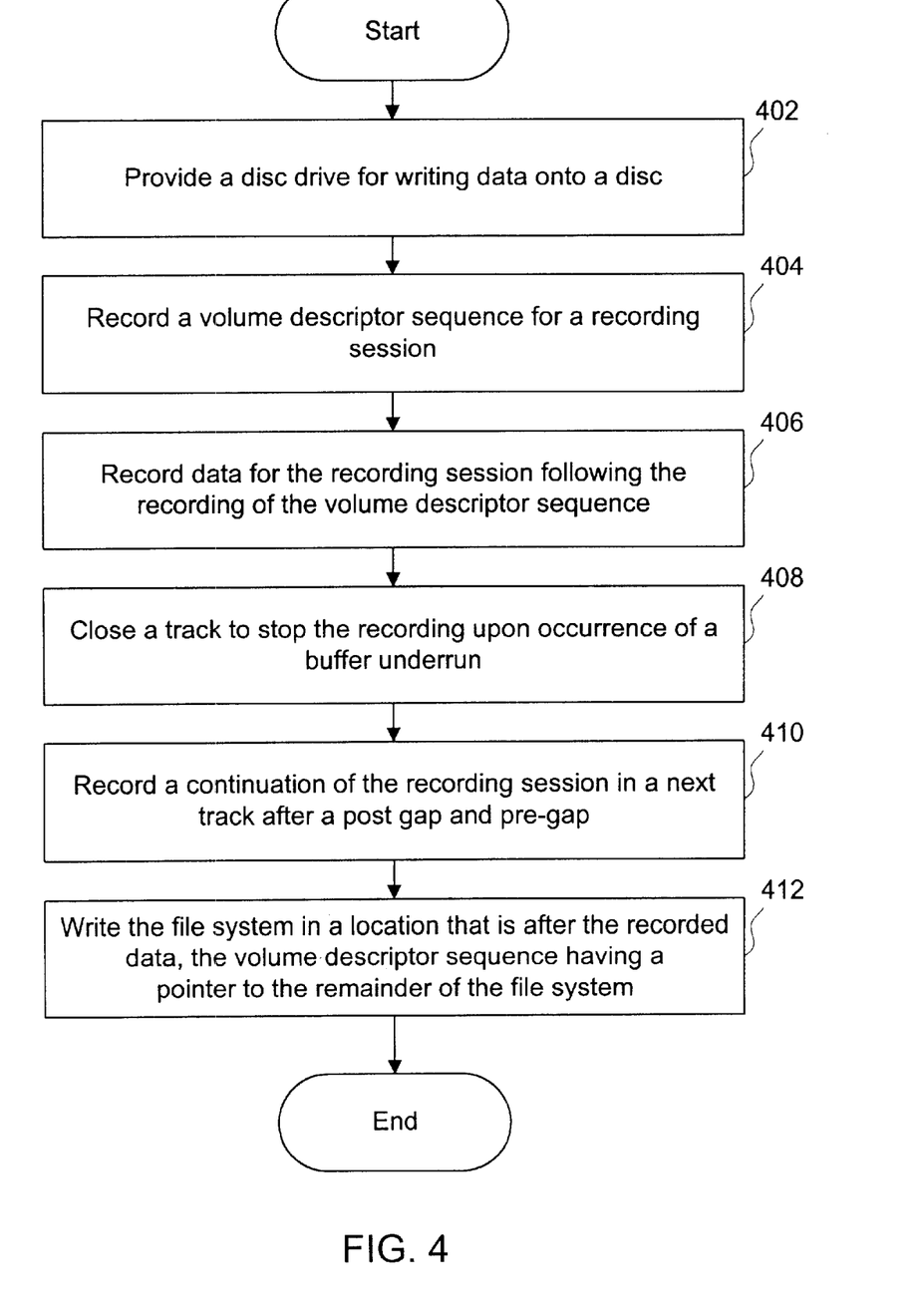
FIG. 4 shows a flow chart of a sequence of operations in accordance with one embodiment of the invention.

FIG. 4 shows a flowchart of a sequence of operations in accordance with one embodiment of the invention. The method begins with operation 402 where a disc drive is provided for writing data onto a disc. In one embodiment, the disc drive is preferably one that is configured to write data onto an optical disc. The optical disc is preferably one of a compact disc recordable (CDR), a compact disc rewritable (CD R/W), a digital video disc (DVD), and the like. The disc drive is configured to have a buffer for storing data that is to be written to or read from the optical disc. Other standard electronics, such as, a digital signal processor (DSP), and an actuator for moving a read/write head over a desired location over the optical disc are also required for recording on an optical disc.

The method continues with operation 404 where a volume descriptor sequence (VDS) is recorded onto a disc for a recording session. As is well known and described in the ISO 9660 standard, there may be more than one VDS. Preferably, the VDS is recorded to sector 16. The method now continues with operation 406 where data for the recording session is recorded following the recording of the VDS. The method proceeds with operation 408 where a track is closed to stop the recording upon occurrence of a buffer under-run. The method then proceeds to operation 410 where the recording session continues in a next track after a post-gap and pre-gap. The method finishes in operation 412 by writing the file system in a location that is after the recorded data. In this embodiment, the VDS has a pointer to the file system.

One benefit and advantage of the invention is higher recording throughput of finished and usable optical discs. Another benefit is faster turn-around time for recording a usable optical disc. An additional benefit is the reduction in the cost of scrapping incompletely recorded and unusable optical discs. Yet another benefit is an increased practicality of optical disc recording at a higher recording speed while obtaining data from a hard drive and a buffer memory with limited memory access speeds.

Examples of variations within the scope of this invention include, but are not limited to, the following: a volume descriptor sequence address pointer for more than three buffer under-runs during a recording session, a volume descriptor sequence not located in sector 16, multiple volume descriptors, multiple file systems, file systems compliant to other standards, such as UDF, and recording sessions with gaps less than or greater than 300 sectors between tracks.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

The exemplary embodiments described herein are for purposes of illustration and are not intended to be limiting. Accordingly, those skilled in the art will recognize that the present embodiments are to be considered as illustrative and not restrictive, and the invention is not to be limited to the details given herein, but may be modified within the scope and equivalents of the appended claims.

What is claimed is:

1. A method for handling buffer under-run while recording data onto a disc during a recording session, comprising:

recording a volume descriptor sequence for the recording session;

recording the data for the recording session following the volume descriptor sequence;

closing a track of the recording session upon an occurrence of a buffer under-run;

recording a continuation of the data in a next track of the recording session; and writing a file system following the data recorded in the next track, the volume descriptor sequence having a pointer to the file system.

2. The method recited in claim 1, wherein the closing of the track operation and the recording the continuation of the data in the next track is repeated at the occurrence of any other buffer under-runs that may occur during the recording session before the writing of the file system, and when there is more than one buffer under-run the next track will represent a last track written for the recording session.

3. The method recited in claim 1, further comprising:

estimating a number of buffer under-runs; and adding a correction increment corresponding to the estimated number of buffer under-runs that is configured to define a location for writing the file system.

4. The method recited in claim 3, wherein the buffer under-run occurs when a rate of recording data onto the disc exceeds a rate of replenishing data in a buffer source.

5. The method recited in claim 3, wherein the operation of estimating the number of buffer under-runs includes analyzing results of a data transfer test.

6. The method recited in claim 1, further comprising:

keeping track of logical block numbers for files of data recorded onto the disc during the recording session.

7. The method recited in claim 6, wherein the file system includes path tables and a directory descriptor, the path tables define directory structures, and the directory descriptor identifies the logical block numbers for the files.

8. The method recited in claim 1, wherein the file system that follows the data recorded in the next track is defined by one of an ISO 9660 standard and a UDF standard.

9. The method recited in claim 1, wherein the file system that follows the data recorded in the next track is written after files of the data have been recorded onto the disc.

10. The method recited in claim 1, wherein the disc is an optical disc.

11. The method recited in claim 10, wherein the optical disc is one of a compact disc recordable (CDR) disc, a compact disc rewritable (CD-RW) disc, and a digital video disc (DVD) disc.

12. A computer readable media having program instructions for handling buffer under-run associated with the recording of one or more files on a disc, the computer readable media including:

program instructions for recording a volume descriptor sequence for the recording session;

program instructions for recording the data for the recording session following the volume descriptor sequence;

program instructions for closing a track of the recording session upon an occurrence of a buffer under-run;

program instructions for recording a continuation of the data in a next track of the recording session; and program instructions for writing a file system following the data written in the next track, the volume descriptor sequence having a pointer to the file system, and wherein the closing of the track instruction and the recording the continuation of the data in the next track is repeated at the occurrence of any other buffer under-runs that may occur during the recording session before the writing of the file system instruction is performed, and when there is more than one buffer under-run the next track will represent a last track written for the recording session.

13. A computer readable media having program instructions for handling buffer under-run associated with the recording of one or more files on a disc as recited in claim 12, further comprising:

program instructions for estimating a number of buffer under-runs; and program instructions for adding a correction increment, corresponding to the estimated number of buffer under-runs, that is configured to define a location for writing the file system.

14. A computer readable media having program instructions for handling buffer under-run associated with the recording of one or more files on a disc as recited in claim 13, wherein a buffer under-run occurs when a rate of recording to the disc exceeds a rate of replenishing a buffer source.

15. A computer readable media having program instructions for handling buffer under-run associated with the recording of one or more files on a disc as recited in claim 12, further comprising:

program instructions for keeping track of logical block numbers for files of data recorded onto the disc during the recording session.

16. A computer readable media having program instructions for handling buffer under-run associated with the recording of one or more files on a disc as recited in claim 12, wherein the file system includes path tables and a directory descriptor, the path tables define directory structures and the directory descriptor identifies the logical block numbers for the files.

17. A computer readable media having program instructions for handling buffer under-run associated with the recording of one or more files on a disc as recited in claim 12, wherein the file system that follows the data recorded in the next track is written in a format compatible with UDF.

18. A computer readable media having program instructions for handling buffer under-run associated with the recording of one or more files on a disc as recited in claim 12, wherein the file system that follows the data recorded in the next track is written after files of the data have been recorded onto the disc.

* * * * *